United States Patent Office 2,705,235
Patented Mar. 29, 1955

2,705,235

HEXACHLORO-METHANO-OXA-NAPHTHALENE COMPOUNDS

Morton Kleiman, Chicago, Ill., assignor to Arvey Corporation, Chicago, Ill., a corporation of Illinois No Drawing. Application July 14, 1953, Serial No. 367,967

5 Claims. (Cl. 260—346.2)

This invention relates to a new group of compositions of matter. More specifically, this invention relates to a group of compounds characterized in part by their having a partially hydrogenated naphthalene structure with the 1,4 and 5,8 carbon atoms thereof being bridged respectively by an endomethano group and an oxygen bridge, and further characterized by being hexahalogenated in fixed and known positions. The present compounds are further particularly characterized in that each possesses an oxygen containing side chain in the number 5 position of the molecule.

The compounds of the present invention have the following structural formula:

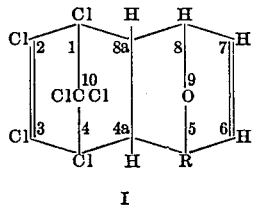

I wherein R is an organic radical containing oxygen as more particularly defined hereinafter.

The present compounds may be prepared by reacting 1,2,3,4,7,7-hexachlorobicyclo-(2.2.1)-2,5-heptadiene and a furan possessing an oxygen containing side chain in the number 2 position thereof to form a Diels-Alder adduct.

Furfural, which is the most common furan derivative possessing an oxygen containing side chain in the number 2 position, does not react with the above defined heptadiene to form a Diels-Alder adduct. It is therefore unusual and unexpected that the furan derivatives hereinafter enumerated do undergo said Diels-Alder reaction to form the present novel and valuable compositions. This is especially so since furfural is quite a reactive material and contains one of the simplest types of oxygen containing side chains possible, namely, one containing only a single carbon atom, a single hydrogen atom, and a single oxygen atom.

It is unusual that by the expedient of utilizing a reduced form of furfural, namely furfuryl alcohol containing a carbon atom, an oxygen atom and 3 hydrogen atoms in the side chain, an adduct with the said heptadiene is obtainable. It is equally surprising that the furans containing more complex side chains such as furfuryl methyl ether, furfuryl acetate and furfural diacetate likewise undergo the reaction with said heptadiene.

The furan derivatives useful in the present invention can be identified by structure as follows:

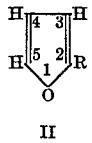

II wherein R is —CH₂OH (furfuryl alcohol), —CH₂OCH₃ (furfuryl methyl ether), —CH₂OCOCH₃ (furfuryl acetate), and —CH(OCOCH₃)₂ (furfural diacetate).

The R as defined here is, of course, identical with the R shown in the number 5 position of structure I.

The reaction involved in preparing the present compounds can be illustrated by the following reaction equation:

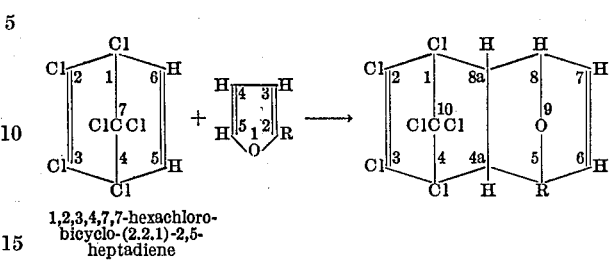

1,2,3,4,7,7-hexachloro-
bicyclo-(2.2.1)-2,5-
heptadiene

When R is —CH₂OH, the product is 1,2,3,4,10,10-hexachloro - 1,4 - methano - 5 - hydroxymethyl-5,8-oxa-1,4,4a,5,8,8a-hexahydronaphthalene.

When R is —CH₂OCH₃, the product is 1,2,3,4,10,10-hexachloro - 1,4 - methano - 5 - methoxymethyl-5,8-oxa-1,4,4a,5,8,8a-hexahydronaphthalene.

When R is —CH₂OCOCH₃, the product is 1,2,3,4,10,10-hexachloro - 1,4 - methano-5-acetoxymethyl-5,8-oxa-1,4,4a,5,8,8a-hexahydronaphthalene.

When R is —CH(OCOCH₃)₂, the product is 1,2,3,4,10,10-hexachloro - 1,4 - methano-5,8-oxa-1,4,4a,5,8,8a-hexahydronaphthaldehyde-5-diacetate.

1,2,3,4,7,7 - hexachlorobicyclo-(2.2.1)-2.5-heptadiene, which is a starting material in the process, may be prepared by reacting hexachlorocyclopentadiene with vinyl chloride to form the Diels-Alder adduct of these components and then dehydrohalogenating said adduct. In a specific method for preparing this bicyclic diene, hexachlorocyclopentadiene (2,205 g.; 8.1 moles) was placed into a 2-liter, 3-necked flask equipped with a stirrer, thermometer and reflux condenser containing a gas inlet tube equipped with a sparger extending below the surface of the hexachlorocyclopentadiene. While maintaining the hexachlorocyclopentadiene at 200° C., vinyl chloride was bubbled through it continuously for a period of 14 hours. During this period 482 g. (7.7 moles) of vinyl chloride reacted with the hexachlorocyclopentadiene. The product of this reaction, 1,2,3,4,5,7,7-heptachlorobicyclo-(2.2.1)-2-heptene, was purified by vacuum fractional distillation. The product distilled at 147–148° C. (stillhead temperature) at a pressure (absolute) of 12 mm. of mercury. The purified adduct (33.5 g.) was added to a refluxing solution of KOH (8 grams) in absolute ethanol (100 ml.). Heating was continued to maintain the mixture at reflux temperature for three additional hours. After this time the ethanol was removed by evaporation in vacuo and the residue taken up in hexane. The hexane solution was filtered to remove KCl and unreacted KOH. The hexane was removed from the filtrate by distillation, and the residue, containing the desired bicycloheptadiene product was purified by vacuum fractional distillation with said product being recovered at a temperature of 128–130° C. under 7.0 mm. mercury pressure (absolute).

The preparation of the products of the present invention is specifically exemplified by the following.

Example I

Preparation of 1,2,3,4,10,10-hexachloro-1,4-methano-5 - methoxymethyl - 5,8 - oxa-1,4,4a,5,8,8a-hexahydronaphthalene.

Furfuryl methyl ether (30 g.; 0.27 mole), 1,2,3,4,7,7-hexachlorobicyclo-(2.2.1) - 2,5-heptadiene (60 g.; 0.2 mole), propylene oxide (1 ml.) and hydroquinone (trace) were heated under a nitrogen atmosphere in a 200 ml., 3-necked flask equipped with a stirrer, reflux condenser and thermometer at a temperature of 150–175° C. for three hours. The reaction mixture was then cooled and extracted with pentane. The pentane extract was fractionated by vacuum distillation and the fraction boiling at 154–172° C. at 0.8 mm. Hg pressure (absolute) was recovered. This fraction was crystallized several times from pentane, and after such purification melted at 93–95° C.

| | Percent C | Percent H | Percent Cl |
|---|---|---|---|
| Analysis of product | 38.19 | 2.51 | 51.21 |
| Calculated for $C_{13}H_{10}Cl_6O_2$ | 37.99 | 2.45 | 51.76 |

*Example II*

Preparation of 1,2,3,4,10,10-hexachloro-1,4-methano-5 - hydroxymethyl - 5,8 - oxa - 1,4,4a,5,8,8a - hexahydronaphthalene.

1,2,3,4,7,7 - hexachlorobicyclo - (2.2.1) - 2,5 - heptadiene (60 g.; 0.2 mole) and propylene oxide (3 ml.) were heated to 122° C. in a 200 ml., 3-necked flask equipped with a reflux condenser, stirrer, dropping funnel and thermometer. Furfuryl alcohol (20 g.; 0.2 mole) was added in a dropwise manner over a 15 minute period. When the addition was complete the temperature of the reaction mixture was raised to about 150° C. and thus maintained for an additional 3 hours. The reaction mixture was then cooled and extracted with pentane. The pentane extract was chilled and the product crystallizing therefrom was isolated by filtration. The crystals were further purified by recrystallization from pentane. The thus purified product melted at 162–163° C. and had the following analysis:

| | Percent C | Percent H | Percent Cl |
|---|---|---|---|
| Analysis of product | 36.24 | 2.09 | 53.64 |
| Calculated for $C_{12}H_8Cl_6O_2$ | 36.32 | 2.02 | 53.60 |

*Example III*

Preparation of 1,2,3,4,10,10-hexachloro-1,4-methano-5 - acetoxymethyl - 5,8 - oxa - 1,4,4a,5,8,8a - hexahydronaphthalene.

1,2,3,4,7,7 - hexachlorobicyclo - (2.2.1) - 2,5 - heptadiene (0.205 mole; 62 g.) and propylene oxide (1 ml.) were heated to 175° C. in a 200 ml., 3-necked flask equipped with a stirrer, reflux condenser, dropping funnel and thermometer. Furfuryl acetate (0.22 mole; 31 g.) was slowly added in a dropwise manner over a 45-minute period. When this addition was complete the reaction mixture was heated for an additional one-hour period at a temperature of 175°–180° C. The reaction mixture was then fractionated by distillation and the desired fraction boiled at 160°–185° C. at 0.7 mm. mercury pressure (absolute). This fraction was purified by several crystallizations from pentane. The thus purified product melted at 88–90° C. and had the following analysis:

| | Percent C | Percent H | Percent Cl |
|---|---|---|---|
| Analysis of product | 38.24 | 2.15 | 48.37 |
| Calculated for $C_{14}H_{10}Cl_6O_3$ | 38.31 | 2.28 | 48.47 |

*Example IV*

Preparation of 1,2,3,4,10,10-hexachloro-1,4-methano-5,8 - oxa - 1,4,4a,5,8,8a - hexahydronaphthaldehyde - 5-diacetate.

A mixture of furfural diacetate (52 g.; 0.26 mole), 1,2,3,4,7,7-hexachlorobicyclo-(2.2.1)-2,5-heptadiene (68 g.; 0.228 mole), propylene oxide (3 ml.) and hydroquinone (trace) was heated at 168° C. under nitrogen atmosphere in a 200 ml., 3-necked flask equipped with stirrer, reflux condenser, gas inlet tube and thermometer. After heating at about 168° C. for four hours the reaction mixture was cooled and dissolved in diethyl ether. The ether solution was treated with activated charcoal and recovered by filtration. The product was precipitated from the ether solution by the addition of pentane thereto and was isolated by filtration. The crystalline product was purified by recrystallization from an ethanol-pentane solution and melted at 218.5–221° C.

The reaction to produce the present products involves an equimolar adduction of the reactants utilized, namely, hexachlorobicycloheptadiene and the furan derivatives as listed. While hexachlorobicycloheptadiene has two double bonds, only the unsubstituted one (i. e. the carbon atoms of which have hydrogen attached thereto) is reactive in the present case and therefore no special precautions need be taken to avoid reaction at the substituted double bond.

In view of the foregoing, an equimolar ratio of reactants, or an excess of the furan derivative (dienic component) is preferred. Lesser proportions of the furan derivative may be utilized, but such would result in an incomplete utilization of the bicyclic component and is therefore uneconomical.

The reaction temperature is not critical in that it may vary over a range of temperatures. Thus, the present furan derivatives can be adducted with hexachlorobicyclo-(2.2.1)-2,5-heptadiene at temperatures between about 100° C. to about 200° C. Excessively high temperatures may cause some decomposition and are therefore undesirable. The use of lower temperatures merely reduces the rate of reaction. Temperatures between about 125° C. and about 185° C. are eminently suited insofar as rate of reaction and quality of product are concerned.

As is the case with most chemical reactions, the rate thereof is proportional to the temperature. The reaction time may vary between about ½ to about 10 or more hours, depending on the temperature employed. When employing temperatures in the lower portion of the range, the time required to complete the reaction may be about 10 or more hours. The use of more elevated temperatures substantially reduces the length of time. Excess time is not harmful since after reaction has taken place the product is reasonably stable. Less time than is required to complete the reaction only results in having some unreacted components in the reaction mixture, but does not affect the obtaining of the desired product.

The reaction is preferably carried out in the absence of solvent; however, where temperature control is desired, the use of a solvent boiling at approximately the temperature of reaction may be used and may be preferred. The solvents useful in the present process are many; it being only desired that such solvent be not reactive under the conditions utilized and that its solvency characteristics be such as to at least partially dissolve the reacting components. Hydrocarbon solvents, both aliphatic and aromatic, chlorinated solvents, alcohols, ethers, esters and the like are suitable. Specifically, benzene, toluene, xylene, hexane, heptane, carbon tetrachloride chloroform, ethanol, diethyl ether, etc., are useful solvents in the present process.

Pressure techniques may also be utilized to prepare the adducts of the present invention. Thus the reactants can be placed in a pressure vessel and reacted under the pressure generated by the vapor of the reactants and solvent (if the latter be utilized). Since the reaction involves the formation of 1 mole of product per 2 moles reactant, the application of pressure is desirable. The use of a nitrogen atmosphere, a stabilizer such as propylene oxide, and an antioxidant such as hydroquinone is not essential to the reaction, but is useful in minimizing side reactions.

The compounds of the present invention possess excellent insecticidal activity to a wide variety of insect pests. The present compounds may be utilized and applied as a sole active ingredient dispersed in carriers such as dusts, solvents, aqueous dispersions or other carriers frequently used in the art. In addition, the compounds of the present invention can be used in combination with other insecticides or fungicides.

The present compounds are further useful in the preparation of other chemicals. Each of the present compounds possesses an oxygen containing side chain which is susceptible to reaction to modify the product to produce different insecticides, fungicides, herbicides, and the like.

I claim:

1. As a new composition of matter a compound having the structure:

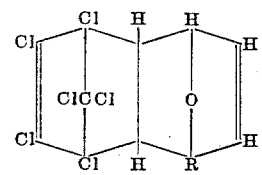

wherein R is an oxygen containing radical selected from the group consisting of (1) —CH₂OH, (2) —CH₂OCH₃, (3) —CH₂OCOCH₃, and (4) —CH(OCOCH₃)₂.

2. 1,2,3,4,10,10 - hexachloro - 1,4 - methano - 5 - hydroxymethyl - 5,8 - oxa - 1,4,4a,5,8,8a-hexahydronaphthalene.

3. 1,2,3,4,10,10 - hexachloro - 1,4 - methano - 5 - methoxymethyl - 5,8 - oxa - 1,4,4a,5,8,8a-hexahydronaphthalene.

4. 1,2,3,4,10,10 - hexachloro - 1,4 - methano - 5 - acetoxymethyl - 5,8 - oxa - 1,4,4a,5,8,8a - hexahydronaphthalene.

5. 1,2,3,4,10,10 - hexachloro - 1,4, - methano - 5,8-oxa - 1,4,4a,5,8,8a - hexahydronaphthaldehyde - 5 - diacetate.

References Cited in the file of this patent

UNITED STATES PATENTS

| 2,655,513 | Kleiman | Oct. 13, 1953 |
| 2,655,514 | Kleiman | Oct. 13, 1953 |